United States Patent [19]

Nakane et al.

[11] Patent Number: 4,640,400

[45] Date of Patent: Feb. 3, 1987

[54] AUTOMATIC WEAR COMPENSATION MECHANISM

[75] Inventors: Mototaka Nakane; Shizuo Tanaka, both of Toyota, Japan

[73] Assignees: Aisin Seiki Kabushiki Kaisha, Aichi; Toyota Jidosha Kabushiki Kaisha, Aichi, both of Japan

[21] Appl. No.: 709,335

[22] Filed: Mar. 7, 1985

[30] Foreign Application Priority Data

Mar. 8, 1984 [JP] Japan .................................. 59-042826

[51] Int. Cl.[4] .............................................. F16D 13/75
[52] U.S. Cl. ............................ 192/70.25; 192/111 A; 188/79.5 SS
[58] Field of Search ............. 192/111 A, 111 R, 70.25, 192/70.26, 70.28; 188/71.8, 79.5 SS

[56] References Cited

U.S. PATENT DOCUMENTS

| 2,385,517 | 9/1945 | Hunt | 192/70.26 X |
| 3,086,634 | 4/1963 | Reed | 192/111 A |
| 3,561,577 | 2/1971 | Binder | 192/111 |
| 3,762,522 | 10/1973 | Kirschling | 192/111 A |
| 4,207,972 | 6/1980 | Zeidler | 192/111 A |
| 4,339,023 | 7/1982 | Maycock | 192/70 |

FOREIGN PATENT DOCUMENTS 1365613 10/1971 United Kingdom .

Primary Examiner—George H. Krizmanich
Attorney, Agent, or Firm—Burns, Doane, Swecker and Mathis

[57] ABSTRACT

An automatic wear compensation mechanism is provided for a clutch. The mechanism regulates the return position of any of the pressure plates and the intermediate plate of the clutch and restricts the return position of the pressure plate or the intermediate plate depending upon the wear of the clutch disc.

10 Claims, 4 Drawing Figures

AUTOMATIC WEAR COMPENSATION MECHANISM

BACKGROUND

The present invention relates to a wear compensation mechanism which is incorporated in a multi-disc clutch; and in particular to a wear compensation mechanism which allows an intermediate plate to follow-up or compensate for the wear of a clutch disc even when the thickness of the clutch disc between a flywheel at the input side and an intermediate plate is diminished due to wear thereof.

A conventional multi-disc clutch includes a spring mechanism disposed between a casing and a pressure plate which biases the pressure plate toward a flywheel for pressing to fasten a clutch disc arranged between the pressure plate and an intermediate pressure plate (hereinbelow referred to as "intermediate plate") and another clutch disc arranged between the intermediate plate and the flywheel so that the rotational torque of the flywheel secured to an input shaft is transmitted to an output shaft.

The flywheel, an intermediate ring, the intermediate plate, the pressure plate and the casing are rotated together with the input shaft irrespective of engegement and disengagement of the clutch. The casing is secured to the flywheel by means of the intermediate ring. The intermediate plate is linked with the intermediate ring disposed radially outside thereof by means of a connecting means (e.g., straps). The straps also serve as the leaf spring and is adapted to bias the intermediate plate toward the casing and adapted to disengage the clutch disc between the flywheel and the intermediate plate from the flywheel by moving the intermediate plate toward the casing (i.e., apart from the flywheel) until the intermediate plate reaches at a given position when the release mechanism linked with the sring mechanism is actuated.

The pressure plate is linked with the casing by means of another connecting means (e.g., straps). When the release mechanism is actuated, the pressure plate is moved toward the casing by a predetermined stroke length by means of the release mechanism for disengaging the clutch disc between the pressure plate and the intermediate plate.

In the case where the clutch disc between the flywheel and the intermediate plate has been worn, the pressure plate is upon engagement offset by a length equal to the reduction in thickness of the clutch disc due to wear toward the flywheel by being biased by the spring mechanism.

SUMMARY OF THE DISCLOSURE

The conventional multi-disc clutch has a disadvantage that clutch disengagement response becomes poor or unsharp as wear of the clutch disc proceeds. The cause thereof resides in the fact that the movement length of the pressure plate required for disengaging the clutch becomes longer than the stroke length of the release mechanism due to the wear of the clutch disc. In other word, upon disengaging the conventional multi-disc clutch, the intermediate plate is moved to a given position toward the casing by the action of the straps for disengaging the clutch disc between the flywheel and the intermediate plate therewith irrespective of the extent of the wear. However, it has turned out that the spacing between the intermediate plate which has been returned to a predetermined position and the pressure plate becomes narrower since the movement length of the pressure plate toward the casing, which has been shifted to the flywheel due to the wear, is restricted by the stroke length of the release mechanism. Accordingly the spacing required for disengaging the clutch disc may not be assured resulting in a poor clutch disengagement response.

In the conventional clutch, there is another disadvantage that the engaging timing of the clutch becomes delayed or irregular and the idle stroke length of a clutch actuating means (e.g., clutch pedal or servo means) becomes greater as the wear of the clutch disc proceeds under the premises that the actuating stroke or mode for the clutch remains unchanged. Such engaging involves members such as any of the pressure plate(s), any of the clutch disc(s) and the flywheel (or any of other pressure plate).

It is therefore an object of the present invention to provide a novel wear compensation mechanism for regulating the return position of any of the pressure plates, particularly, the intermediate plate in the clutch, particularly, the multi-disc clutch.

It is a further object of the present invention to provide a wear compensation mechanism for restricting the return position of the pressure plate or the intermediate plate depending upon the wear of the clutch disc.

Other object of the present invention will become apparent in the entire disclosure.

According to one aspect of the present invention there is provided a wear compensation mechanism for a clutch comprising:
  a flywheel,
  a casing,
  at least one pressure plate disposed between the casing and the flywheel,
  a spring mechanism for biasing the clutch disc and the pressure plate relative to the casing toward the flywheel, wherein all the foregoing members rotate integrally with each other, and
  at least one clutch disc disposed between the flywheel and the pressure plate;
  wherein the compensation mechanism comprises:
  stopper means which is in the axial direction of the clutch slidably fitted to a ring member secured to a flywheel and to a pressure plate (or intermediate pressure plate) disposed substantially within the ring member for allowing the pressure plate to move by a given length toward the casing relative to the ring member when a release mechanism acts;
  movement restriction means having a friction engagement member which is in contact with the pressure plate at the side thereof directed to the flywheel for supporting and restricting the pressure plate due to the frictional force of the friction engagement member in an axial direction of the clutch;
  biasing means disposed coaxially with the movement restriction means for biasing the movement restriction means back to the casing; and
  connecting means which link the ring member with the pressure plate for biasing the pressure plate toward the flywheel;
  the frictional force of the friction engagement member being preset to a value lower than the biasing force of said spring mechanism and higher than the force of the biasing means applied upon the movement restriction means, and the biasing force of the connecting means being preset to a value lower than the force of the biasing means exerted to the movement restriction means.

According a second aspect of the present invention, there is provided a wear compensation mechanism for a multi-clutch disc with at least two clutch discs and pressure plates associated therewith. The second pressure plate which will abut to the clutch disc which comes to contact with the flywheel is referred to as an intermediate plate. Thus according the second aspect there is provided a wear compensation mechanism for a multi-disc clutch comprising:

a flywheel, a casing, a first pressure plate, an intermediate plate disposed between the casing and the first pressure plate, a spring mechanism for biasing the clutch disc and the intermediate plate relative to the casing toward the flywheel, wherein all the foregoing members rotate integrally with each other, and at least two clutch discs disposed between the flywheel and the intermediate plate and between the intermediate plate and the first pressure plate;

wherein the compensation mechanism comprises:

stopper means which is in the axial direction of the clutch slidably fitted to a ring member secured to a flywheel and to an intermediate plate disposed substantially within the ring member for allowing the intermediate plate to move by a given length toward the casing relative to the ring member when a release mechanism acts;

movement restriction means having a friction engagement member which is in contact with the intermediate plate at the side thereof directed to the flywheel for supporting and restricting the intermediate plate due to the frictional force of the friction engagement member in an axial direction of the multi-disc clutch;

biasing means disposed coaxially with the movement restriction means for biasing the movement restriction means back to the casing; and connecting means which link the ring member with the intermediate plate for biasing the intermediate plate toward the flywheel;

the frictional force of the friction engagement member being preset to a value lower than the biasing force of said spring mechanism and higher than the force of the biasing means applied upon the movement restriction means, and the biasing force of the connecting means being preset to a value lower than the force of the biasing means exerted to the movement restriction means.

The movement restriction means may comprise a pin having a stopper at an end thereof directed to the flywheel; a sleeve which is fitted onto the pin at other opposite to the stopper and is slidably fitted to the pressure plate or intermediate plate; and the friction engagement member which is frictionally engaged with the sleeve. The biasing means is preferably positioned between the sleeve and the ring member.

Also, the movement restriction means may be comprised of a pin having a stopper at an end thereof directed to the flywheel and an opposite portion which is slidably fitted to the pressure plate or intermediate plate, and a friction engagement member which is engaged with the pin at the side opposite to the stopper under an axial frictional force. The biasing means is preferably positioned with the freewheel which abuts on the stopper.

The friction engeagement member may comprise a plurality of snap rings. The biasing means may comprise a compressing coil spring. The connecting means may comprise straps.

In the following preferred embodiments of the present invention will be described with reference to the accompanying drawings, which, however, are presented for illustrative purpose and met for limitative purpose.

DETAILED DESCRIPTION OF THE PREFERRED EMBODIMENTS

The essential features of the present invention will be described with reference to the second aspect.

In the arrangement of the second aspect, when the clutch disc (first clutch disc) between the flywheel and the intermediate plate (first pressure plate) is worn, the intermediate plate which is biased by the spring mechanism is moved toward the flywheel by a length equal to the reduction in the thickness of the worn clutch disc against the frictional force of the snap rings which constitute friction engagement members. When the release mechanism is actuated stating from a position at which the clutch is engaged, the first pressure plate will be moved toward the casing by the stroke length of the release mechanism, whereupon the pin (providing the movement restriction means) and the intermediate plate abutting on the snap rings (providing the friction engagement member) will be moved toward the casing by being biased by the compression coil spring (providing the biasing means). Since the movement of the pin is restricted between the stopper at the left end thereof and the ring member so that the movement stroke is limited, the pin is normally moved only by a limited given length toward the casing. Thereupon the intermediate plate which is under the biasing force toward the flywheel by the straps will not be returned to the original position and will be returned to a position by a predetermined length closer to the casing in respone to the pin. This predetermined length is such that enough to disengage the clutch disc between the flywheel and the intermediate plate therewith.

The present wear compensation mechanism cancells the reduction in the thickness of the clutch disc due to wear by causing the intermediate plate to shift by a length equal to the reduction in the thickness toward the flywheel even when the pressure plate approaches by the length equal to the reduction in the thickness toward the flywheel.

Accordingly the spacing between intermediate plate and the first pressure plate will be kept equal to an original spacing, resulting in good clutch disengagement response.

It should be noted the above discussion applies also to the first aspect by replacing the pressure plate (first aspect) for the intermediate plate (second aspect).

EXAMPLES

Figure 1:
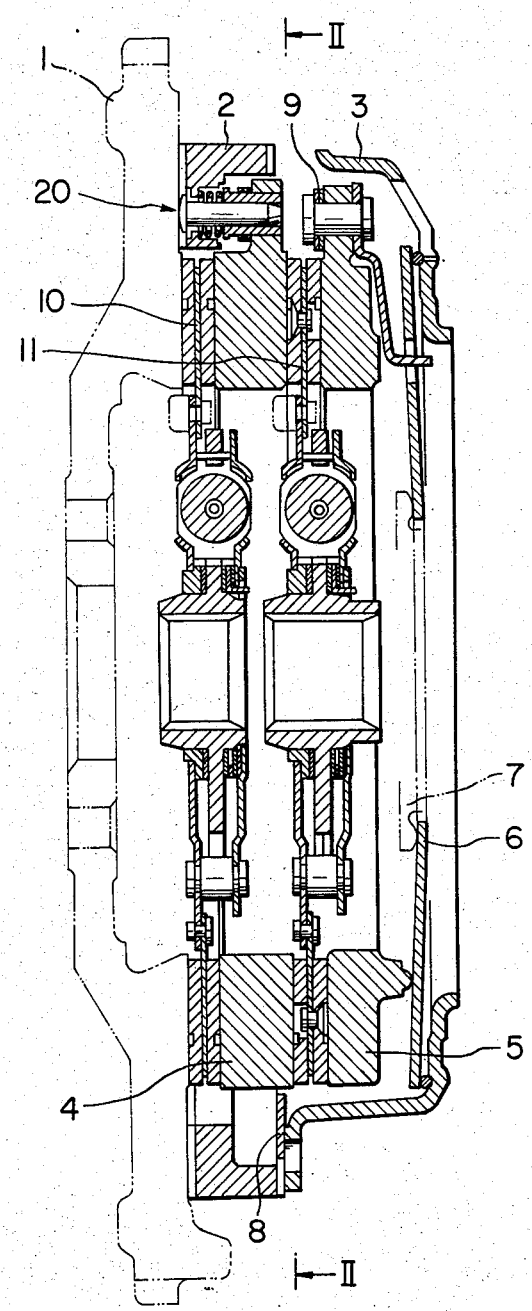
FIG. 1 is a sectional view showing a twin disc type clutch incorporating a wear compensation mechanism.
Figure 2:
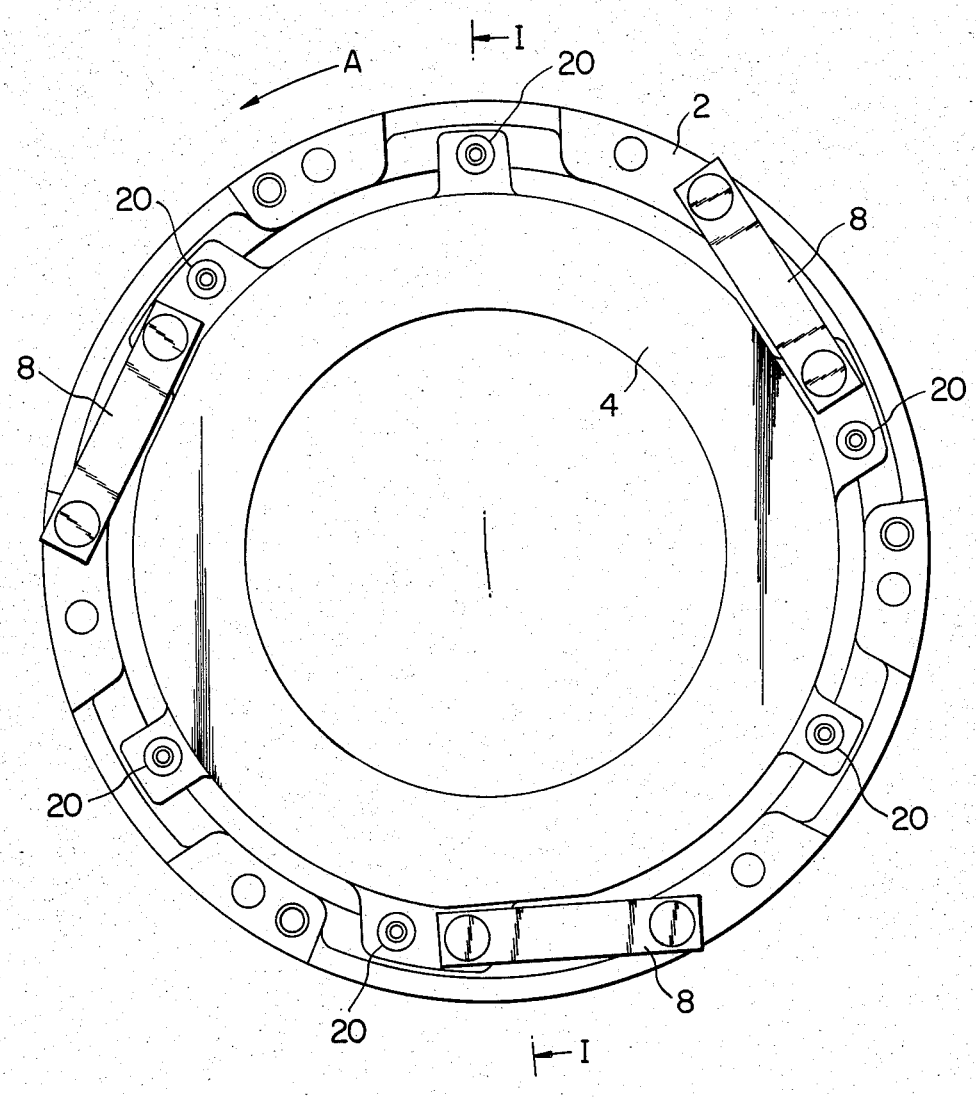
FIG. 2 is a front view showing the assembly of an intermediate ring and an intermediate plate.

Referring now to FIGS. 1 and 2, there is shown a twin-disc type clutch which includes a flywheel 1 secured to an input shaft, an intermediate ring 2 (the ring member) and a casing 3 which are secured to the flywheel 1, an intermediate plate 4 (first pressure plate) disposed within the intermediate ring 2, a first pressure plate 5 (second pressure plate) disposed within the casing 3, a diaphragm spring 6 (spring mechanism) which is a spring mechanism linked with the first pressure plate 5 and a release mechanism 7 for releasing the biasing force of the diaphragm spring 6 to disengage the clutch. The above-mentioned members 1, 2, 3, 4 and 5 and mechanisms 6 and 7 are adapted to be rotated integral with the input shaft. The intermediate plate 4 is linked with the intermediate ring 2 by means of straps 8 (connecting means). When the intermediate ring 2 is rotated in a direction of rotation designated by an arrow A, the intermediate plate 4 is entrained by the straps 8 to rotate in the same direction. Each of the straps 8 also serves as a leaf spring for biasing the intermediate plate 4 toward the flywheel 1. The pressure plate 5 is linked with the casing by means of straps 9 in the same manner as the intermediate plate 4.

A clutch disc 11 (second clutch disc) between the intermediate plate 4 and the pressure plate 5 and a clutch disc 10 (first clutch disc) between the flywheel 1 and the intermediate plate 4 are mounted on an output shaft so that they are slidable in an axial direction of the output shaft.

Figure 3:
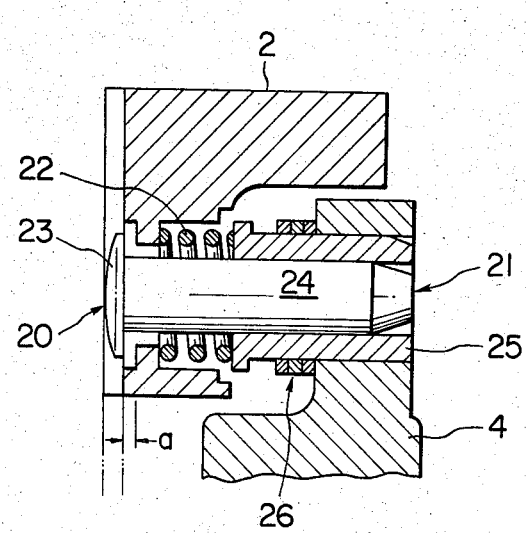
FIG. 3 is a sectional view showing an enlarged essential part of the present invention shown in FIG. 1.

A wear follow-up or compensation mechanism 20 is incorporated in the clutch so that it is slidably fitted to the intermediate ring (within a bore provided therein), and the intermediate plate 4 in an axial direction of the clutch. The twin-disc type clutch in the shown embodiment is provided with six wear compensation mechanisms 20 at different angular positions along the periphery of the clutch as shown in FIG. 2. This wear compensation mechanism 20 is shown in detail in FIG. 3.

The wear compensation mechanism 20 comprises a movement restriction means 21 which is positioned centrally of this mechanism 20, a compression coil spring 22 (biasing means) disposed coaxially with the movement restriction means 21 for biasing the movement restriction means 21 rearward to the casing 3 and straps 8 which link the intermediate ring 2 with the intermediate plate 4.

The movement restriction means 21 comprises a pin 24 having a stopper 23 at the left end thereof, a sleeve 25 fitted on and secured to the pin 24 at an end opposite to the stopper 23 and slidably fitted to the intermediate plate 4, and a plurality of snap rings 26 which are friction-engaged with the sleeve 25. The movement length of the pin 24 which is also loosely fitted to the intermediate ring 2 is restricted by a spacing a between the stopper 23 and the intermediate ring 2. The spacing a should have a distance enough to separate the clutch disc 10 disposed between the flywheel 1 and the intermediate plate 4 therefrom.

The aforementioned compression coil spring 22 is disposed between the intermediate ring 2 and the sleeve 25.

The frictional force produced between a plurality of the snap rings 26 and the sleeve 25 is preset to a value which is lower than the biasing force of the diaphragm spring 6 and higher than the spring force of the compression coil spring 22. The biasing force of the straps 8 is preset to a value lower than the spring force of the compression spring 22.

The frictional force of the snap rings 26 may be adjusted by decreasing or increasing the number of the snap rings 26.

After the clutch disc 10 has worn to some extent due to repetition of the engagement and disengagement of the clutch, the intermediate plate 4 is upon clutch engagement moved toward the flywheel 1 by means of the diaphragm 6, thereby causing the clutch disc 10 to move toward the flywheel 1 overcoming the frictional force of the snap rings 26, until balanced with the biasing force of the diaphragm spring 6. At this time the snap rings 26 slide along the sleeve 25 toward the flywheel 1 by being pressed by the intermediate plate 4 and stopped at a balanced position.

Upon disengagement of the clutch, the pressure plate 5 is moved by a stroke length of the release mechanism 7 toward the casing 3 and the intermediate plate 4 is moved toward the casing 3 by a spring a determined by the intermediate ring 2 and the stopper 23 of the pin 24 due to the compression coil spring 22. The intermediate plate 4 will not be moved anymore toward the casing 3 by the biasing force of the straps 8. Such an action keeps the spacing a enough to disengage the clutch disc 10 between the flywheel 1 and the intermediate plate 4 therewith and secures the original spacing between the intermediate plate 4 and the pressure plate 5 prior to wearing. Accordingly the disadvantage of the poor clutch disengagement response due to the wear of the clutch disc 10 may be overcome by the incorporation of the wear compensation mechanism 20.

By the same token the irregularity or delay of the clutch engagement can be overcome thereby to maintain the originally set engaging timing even when the clutch disc wear proceeds.

Figure 4:
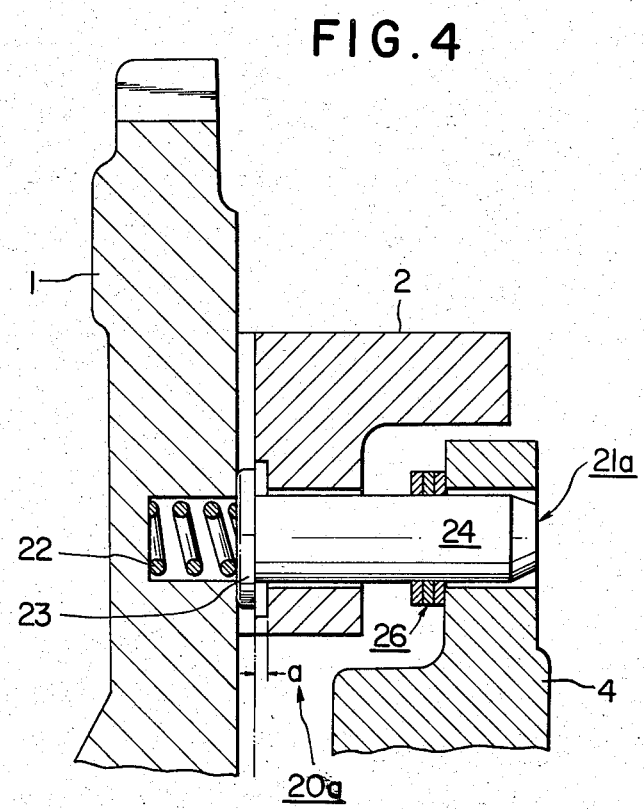
FIG. 4 is a sectional view showing another embodiment of the present invention.

FIG. 4 shows another embodiment of the present invention in which the movement restriction means in the afore-mentioned embodiment is replaced with a wear compensation mechanism 20a and the position of the compression coil spring has been altered.

The movement restriction means 21a comprises a pin 24 having a stopper 23 and a plurality of snap rings 26 which are frictionally engaged with the pin 24. The pin disposed in an axial direction of the clutch is fitted in the intermediate ring 2 and the intermediate plate 4. The axial movement stroke of the pin 24 is restricted by the intermediate ring 2 and the stopper 23.

The compression coil spring 22 which biases the pin 24 back to the casing 3 is disposed within the flywheel 1 which comes to contact with the stopper 23.

What is claimed is:

1. An automatic wear compensation mechanism for a clutch comprising:
   a flywheel connectable to an input member,
   a casing secured integral with the flywheel,
   at least one pressure plate disposed between the casing and the flywheel,
   at least one clutch disc disposed between the flywheel and the pressure plate;
   a spring mechanism for biasing the clutch disc and the pressure plate relative to the casing toward the flywheel, wherein the flywheel, the casing, the pressure plate and the clutch disc rotate integrally with each other;
   wherein the compensation mechanism includes:
   a ring member secured to said flywheel and disposed substantially outside of the pressure plate, stopper means which is axially of the flywheel slidably fitted to the ring member and the pressure plate for allowing the pressure plate to move by a given length toward the casing relative to the ring member when a release mechanism acts on the spring mechanism for disengaging the clutch disc from the flywheel, the stopper means being engageable with the ring member at a predetermined axial sliding in a releasing direction of the pressure plate;

movement restriction means having a friction engagement member which is friction-engaged with the stopper means and in contact with the pressure plate at the side thereof directed to the flywheel for supporting and restricting the pressure plate due to the frictional force of the friction engagement member in an axial direction of the flywheel;

biasing means disposed coaxially with the movement restriction means for biasing the movement restriction means toward the casing; and connecting means linking the ring member with the pressure plate toward the flywheel;

the frictional force of the friction engagement member being preset to a value lower than the biasing force of said spring mechanism and higher than the force of the biasing means applied upon the movement restriction means, and the biasing force of the connecting means being preset to a value lower than the force of the biasing means exerted to the movement restriction means.

2. An automatic wear compensation mechanism for a clutch comprising:

a flywheel connectable to an input member, a casing secured integral with the flywheel, a first pressure plate disposed between the casing and the flywheel, a second pressure plate disposed between the casing and the first pressure plate, a first clutch disc disposed between the flywheel and the first pressure plate;

a second clutch disc disposed between the first pressure plate and the second pressure plate, and a spring mechanism for biasing the first and second clutch discs and the first and second pressure plates relative to the casing toward the flywheel, wherein the flywheel, the casing, the pressure plates and the clutch disc rotate integrally with each other;

wherein the compensation mechanism includes:

a ring member secured to said flywheel and disposed substantially outside of the first pressure plate, stopper means axially of the flywheel and slidably fitted to the ring member and the first pressure plate for allowing the intermediate plate to move by a given length toward the casing relative to the ring member when a release mechanism acts on the spring mechanism for disengaging the first clutch disc from the flywheel, the stopper means being engageable with the ring member at a predetermined axial sliding in a releasing direction of the first pressure plate;

movement restriction means having a friction engagement member which is frictionally engaged with the stopper means and in contact with the first pressure plate at the side thereof directed to the flywheel for supporting and restricting the first pressure plate due to the frictional force of the friction engagement member in an axial direction of the flywheel;

biasing means disposed coaxially with the movement restriction means for biasing the movement restriction means toward the casing; and connecting means linking the ring member with the pressure plate for biasing the pressure plate toward the flywheel;

the frictional force of the friction engagement member being preset to a value lower than the biasing force of said spring mechanism and higher than the force of the biasing means applied upon the movement restriction means, and the biasing force of the connecting means being preset to a value lower than he force of the biasing means exerted to the movement restriction means.

3. The automatic wear compensation mechanism as defined in claim 1 in which the stopper means and the movement restriction means are comprised of:

a pin having a stopper at one end thereof directed to the flywheel;

a sleeve which is fitted on and secured to the pin at the other end opposite to the stopper and is slidably fitted to the pressure plate; and the friction engagement member which is frictionally engaged with the sleeve, said biasing means being positioned between the sleeve and the ring member.

4. The automatic wear compensation mechanism as defined in claim 1 in which the stopper means and the movement restriction means are comprised of:

a pin having the stopper at one end thereof directed to the flywheel and the other portion which is slidably fitted to the pressure plate, and the friction engagement member which is frictionally engaged with the pin at the side opposite to the stopper under an axial frictional force, said biasing means being positioned within the freewheel which abuts on the stopper.

5. The automatic wear compensation mechanism as defined in claim 2, in which the stopper means and the movement restriction means are comprised of:

a pin having a stopper at one end thereof directed to the flywheel;

a sleeve which is fitted on and secured to the pin at the other end opposite to the stopper and is slidably fitted to the first pressure plate; and the friction engagement member frictionally engaged with the sleeve, said biasing means being positioned between the sleeve and the ring member.

6. The automatic wear compensation mechanism as defined in claim 2, in which the stopper means and the movement restriction means are comprised of:

a pin having the stopper at one end thereof directed to the flywheel and the other portion slidably fitted to the first pressure plate, and the friction engagement member frictionally engaged with the pin at the side opposite to the stopper under an axial frictional force, said biasing means being positioned within the flywheel which abuts on the stopper.

7. The automatic wear compensation mechanism as defined in claim 1, in which the friction engagement member comprises a plurality of snap rings.

8. The automatic wear compensation mechanism as defined in claim 1 or 2, in which the biasing means comprises a compression coil spring.

9. The automatic wear compensation mechanism as defined in claim 2, in which said friction engagement member comprises a plurality of snap rings.

10. The automatic wear compensation mechanism as defined in claim 2, in which said biasing means comprises a compression coil spring.

* * * * *